Feb. 28, 1950     S. FORBES     2,498,884
CONTROLLING MEANS FOR HEATING DEVICES
Filed April 9, 1946     2 Sheets-Sheet 1
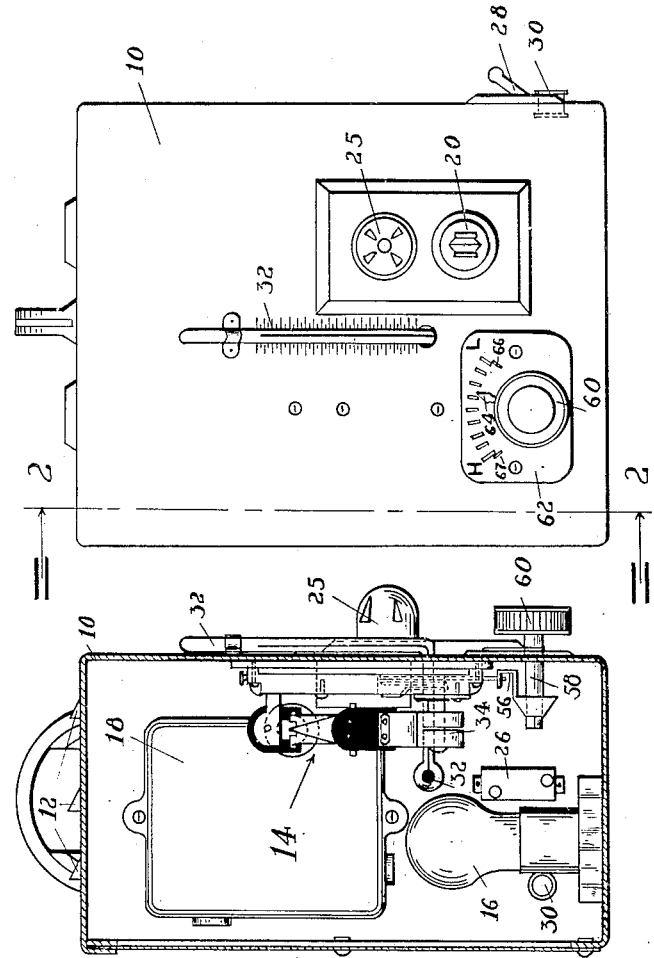
INVENTOR
Samuel Forbes
BY
Busser & Harding
ATTORNEYS.

INVENTOR.
Samuel Forbes
BY
Busser & Harding
ATTORNEYS.

Patented Feb. 28, 1950

2,498,884

UNITED STATES PATENT OFFICE 2,498,884

CONTROLLING MEANS FOR HEATING DEVICES

Samuel Forbes, Philadelphia, Pa., assignor of one-half to Josephine L. Owens, Philadelphia, Pa.

Application April 9, 1946, Serial No. 660,587

3 Claims. (Cl. 219—20)

This invention relates to an improvement in current controlling means for electrically heated articles.

One of the objects of my invention is the provision of a master current controlling means for controlling the time during which the circuit is closed to a plurality of electrically heated devices, whereby the temperature of the devices will not exceed a predetermined limit.

One of the specific objects of my invention is the provision of a control unit for beauty parlors, for controlling the current supplied to an auxiliary line to which a plurality of curling irons, curlers, driers or other devices may be connected, whereby the temperature of the devices will be controlled by the current delivered to the devices from a current supply line, which will be controlled by the temperature maintained in a confined space, and in which the temperature is maintained at the desired temperature. This temperature in the confined space will differ from that of the elements being heated as such devices are heated by self contained heating elements, the current to which will be controlled by the temperature in the confined space.

Figure 1 is a front elevation view of a cabinet enclosing the control devices;

Figure 2 is a sectional view of line 2—2 in Figure 1 from the lamp side, the wiring being omitted for clearness;

Figure 3 is a detailed view of the thermostat;

Figure 4:
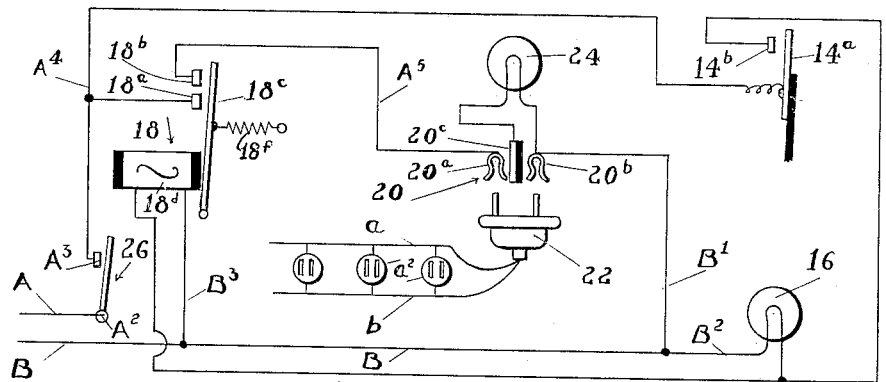
Figure 4 is a diagram with all switches open and in which the plug connecting the auxiliary line is disconnected from its socket, with the thermostat omitted.

Referring to the accompanying drawings in which the reference character 10 designates the casing, in which all of the controlling members are enclosed, the chamber being closed to such an extent that the passage of air currents through the casing is prevented, but is provided at the top with a plurality of louvers 12 to permit the escape of heated air and the admission of a certain amount of air without causing direct drafts over the enclosed members. The louvers 12 may, if desired, be provided with dampers whereby the size of the openings may be varied, in accordance with the variation of the temperature surrounding the casing.

Mounted on the interior of the casing is a thermostat 14, a lamp 16 for heating the thermostat as well as the surrounding atmosphere in the casing, a relay 18 for opening and closing the current supply line circuit under the control of the thermostat. There is also enclosed within the casing, a socket 20, which is arranged for the reception of a plug 22 to which the wires a and b of the auxiliary line for supplying the current to the devices to be heated are connected.

Associated with the socket 20 is a tell-tale lamp 24, through which the circuit is closed when the circuit is closed through auxiliary circuit.

The lamp 24 is covered on the exterior of the casing by means of a cover 25 having sight openings therethrough so it can be seen if the circuit through the auxiliary line is closed.

Mounted on the casing is a snap switch 26 having an operating handle 28 on the exterior of the casing 10, and 30 is a bushing in the wall of the casing through which the wires from the source of current extend and are connected to the switch 26.

Mounted on the exterior of the casing is a thermometer 32, the bulb of which is located adjacent to the expansion coil 34 of the thermostat 14.

The thermostat 14 is of a well known type having an expansion coil 34, one end of which is connected at 35 to a yoke 36, the other end being connected to an arm 35'. The opposite ends of the yoke are adapted to oscillate on a pin 38, and extending from one end of the yoke 36 is a lever 40 having a forked end, and mounted for oscillation on the pin 38 adjacent to the lever 40 is a lever 41 having diverging arms 42 and 44, the forked end of lever 40 being connected to the arm 42 by means of a screw 46, the head of which is engaged by the forked end of arm 42. The forked end of the arm 44 of lever 41 is connected to the short end of a lever 47 pivoted at 48 on a pivot pin extending from the supporting base of the thermostat.

The longer arm of lever arm 47 extends below the base of the thermostat between the base and a retaining plate 50 having an arcuate guide slot 52 therein whose walls are concentric with the axis of the pivot pin 48. Connected to lever 47 and adapted to be moved in the slot 52 is a screw 54 which is adapted to retain lever 47 in proper relation with plate 50.

The lower end of lever 47 is engaged by the forked end of lever 56 connected to the inner end of a shaft 58 mounted for oscillation in the front face of the casing 10, and is provided with an operating knob 60 on the outer end thereof.

Connected to the front face of the casing 10 is a graduated dial 62 and 64 is a needle connected to the shaft 58 adapted to be moved across said dial from one limit stop 66 on one side of the dial to another limit stop 67 at the other side of the dial as shown in Figure 1.

The above mechanism between the knob 60 and the thermostat arm 35, being such that knob 60 is adapted to be moved a considerable distance for a slight movement of the outer end of the arm 35' which carries one of the contact points for closing a circuit as hereinafter described.

Figure 5:
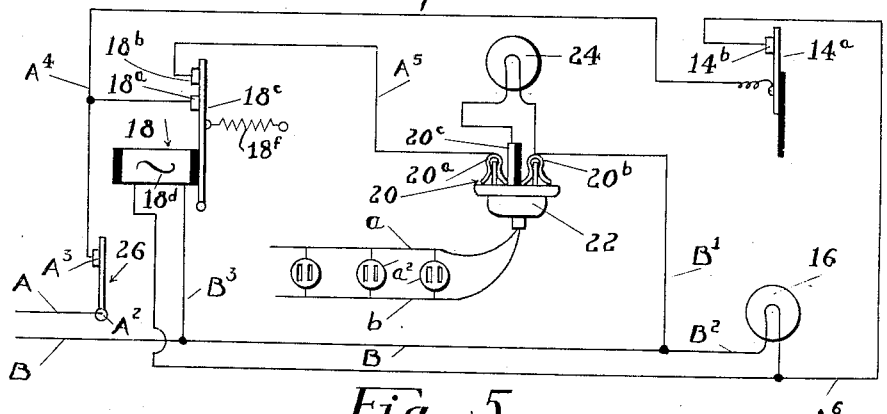
Figure 5 is a view similar to Figure 4 with the thermostat portions omitted, and with the auxiliary line connected to the current supply line, the circuit being closed through the auxiliary line.
Figure 6:
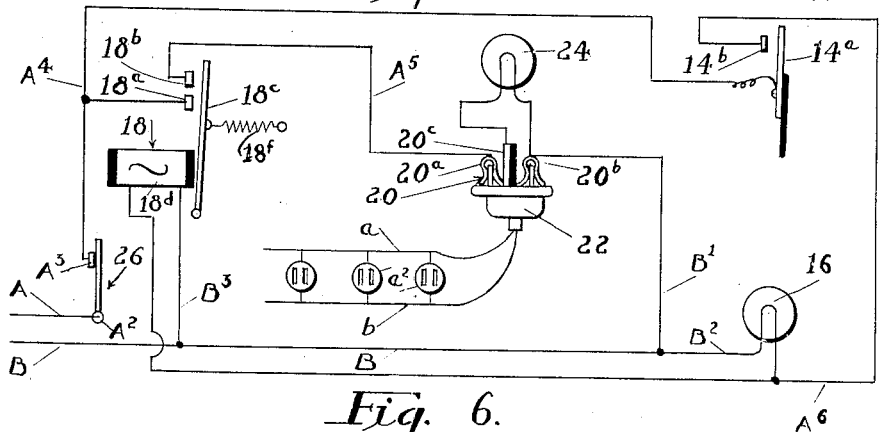
Figure 6 is a view similar to Figure 5 in which the circuit is opened through the auxiliary line.

Referring now to Figures 4, 5 and 6 in which the wiring of the apparatus is diagrammatically illustrated, and in which the wires designated by the reference characters A and B are the wires leading from a source of current supply and are threaded through the bushing 30 extending through the casing 10. The wire A is connected to one pole $A^2$ of the snap switch 26, the wire B being connected to the return wire from the various devices in the casing.

The other pole of the snap switch 26 designated $A^3$ is connected by a wire $A^4$ to a contact $18^a$ of relay 18, and a current conducting arm $14^a$ of the thermostat 14.

Contact $18^b$ of the relay 18 is connected by a wire $A^5$, with a contact $20^a$ of socket 20, the other contact $20^b$ thereof being connected to return wire B by means of wire B'. Adjacent to contact $20^a$ is a contact $20^c$ to which one side of tell-tale lamp 24 is connected, the other side of said lamp being connected to contact $20^b$.

The current conducting arm $14^a$ of the thermostat 14 is arranged to engage a contact $14^b$ to close the circuit from wire $A^4$ to a wire $A^6$ which is connected to one side of the heating lamp 16 as well as an electro-magnet $18^d$ of the relay 18, the other sides of the lamp 16 and magnet $18^d$ are connected to the return wire B by wires $B^2$ and $B^3$, respectively.

The electro-magnet $18^d$ of relay 18 is adapted to close the circuit between contacts $18^a$ and $18^b$ by means of an armature $18^c$ when the circuit through the magnet is closed when the thermostat coil 34 causes the arm $14^a$ to engage contact $14^b$.

Connected to the wires $a$ and $b$ of the auxiliary line throughout the establishment in which, for instance, a plurality of outlets such as $a^2$ are provided, to each of which a connection may be made by a plug or similar connecting member attached to the usual cord connected to the article or apparatus provided with a heating element, it being understood that the current supplied to each heating element will be of the same duration and if the heating elements are all of the same character, each will be heated to substantially the same temperature.

The operation of the apparatus is as follows:

In Figure 4, all circuits are open and the thermostat knob 60 is preferably turned to bring the needle 64 against stop 66 when the circuit from the source of current is cut off by the snap switch 26 and when needle 64 is against stop 66, conducting arm $14^a$ of the thermostat will be remote from contact $14^b$, and will act as an auxiliary switch and will not close the circuit even though the snap switch 26 is closed, as there is no means of heating the thermostat coil to move arm $14^a$ into engagement with contact $14^b$.

The plug 22 to which wires $a$ and $b$ of the auxiliary line is also preferably removed, if the controller is adapted to be shifted from one auxiliary line to another, but if the controller is mounted in a fixed position, a switch may be substituted for the socket 20 and plug 22.

When it is desired to set the device into operation to supply current to wires $a$ and $b$ of the auxiliary line for heating devices connected thereto, the knob 60 is first moved to close contacts $14^a$ and $14^b$ and then moved to the point on the dial indicating the temperature to which hair curlers or other devices are to be heated, the plug 22 is inserted into socket 20 and the snap switch 26 is closed as shown in Figure 5.

After the snap switch 26 is closed as shown in Figure 5, the control circuit from the source of supply or line wires A and B comprises a switch 26, wire $A^4$, contact arm $14^a$, contact $14^b$, wire $A^6$, heating lamp 16, electro-magnet $18^d$ of the relay 18, line $B^3$ to B and from $B^2$ to line B of the source of current supply.

The passing of current through the thermostat contact $14^b$ and arm $14^a$ will close the circuit through the heating lamp 16 and the electro-magnet $18^d$ of the relay 18, the closing of the control circuit through the electro-magnet $18^d$ will attract the armature $18^c$ against the action of spring $18^f$ and close the circuit between contacts $18^a$ and $18^b$, and close the heating circuit through the various devices connected to the wires $a$ and $b$ of the auxiliary line as well as the tell-tale lamp 24, and all circuits will remain closed until the temperature in the coil 34 has reached the temperature at which the needle 64 has been set, this temperature of the coil having a definite relation to the temperature of the curling irons or other devices connected to plugs $a^2$.

As soon as the indicated temperature of coil 34 has reached that set by needle 64, the thermostat coil will expand and withdraw arm $14a$ from contact $14b$, which will open all circuits as shown in Figure 6 and as soon as the temperature of the coil 34 drops slightly below the setting of the needle 64 the thermostat will contract and restore the circuits as shown in Figure 5.

During the period that the circuit is opened by the thermostat, no current will flow through the auxiliary line to the heating elements connected to said auxiliary line or through the tell-tale lamp 24 nor through the heating lamp 16 so that the temperature of the coil will drop as well as the temperature of the apparatus heated by the heating elements, and as soon as the temperature of the thermostat coil 34 falls slightly below the thermostat setting, the thermostat will again close the control circuit to the electro-magnet and again restore the electrical connections as shown in Figure 5.

The contact $14^b$ of the thermostat 14 is connected to the end of an adjusting screw $14^c$ which is threaded in a conducting support $14^d$ mounted on the base of the thermostat, and to which wire $A^6$ is connected. By adjusting the screw, the distance the needle 64 is moved from stop 66 towards stop 67, and, therefore, the distance of the movement of arm $14^a$ towards contact $14^b$ before closing can be varied, so that the temperature from the minimum to the maximum of the coil 34 can be varied, i. e., the less the movement of arm 14ª towards contact 14ᵇ when the thermostat is cold, the lower the minimum temperature that can be obtained by the coil while still controlling the circuit by the thermostat, and the greater the movement of arm 14ª towards contact 14ᵇ when the thermostat is cold the higher the minimum temperature which can be maintained under control of the thermostat.

One of the advantages of my invention results from the provision of a master controller for controlling the current delivered to the heating elements of a plurality of devices to be heated, which are located remote from the controller.

It will be evident that numerous variations in the invention may be made without departing from the principles thereof, as defined in the appended claims.

What I claim and desire to protect by Letters Patent is:

1. A device of the character described, comprising an enclosure, a manually actuated main switch connected to the enclosure, a source of current connected to the one side of the main switch, a heating circuit including a tell-tale light connected to the other side of the main switch, a socket mounted on the enclosure for the reception of a plug to which an auxiliary circuit including a heating element to be periodically heated is connected, switching means associated with the socket arranged to close the circuit through the tell-tale light in response to a plug insertion therein, and an automatic switch for closing and opening the heating circuit to the source of current within the enclosure together with a control circuit including an electro-magnet for closing the switch in the heating circuit when energized and a thermostatic switch having an expansion coil for opening and closing the control circuit to the source of current, adjustable means for tensioning the expansion coil to the required temperature to expand the coil to open the thermostatic switch, heating means in the control circuit adjacent to the expansion coil to heat the coil to open the thermostatic switch when heated to the predetermined required temperature to open the control circuit to cut off the circuit to the electro-magnet and means for opening the switch in the heating circuit when the circuit to the electro-magnet is opened, the thermostatic switch being again closed when the expansion coil is cooled to successively reestablish the control circuit and the heating circuit.

2. A device of the character described adapted to be connected to a source of current comprising a thermally responsive element, an electrical contact controlled by said element, electrical heating means connected in series with said contact and adapted to be energized to heat said element when said contact is closed, a relay coil connected in series with said contact and energized when said contact is closed, said thermally responsive element operating to open said contact and deenergize said heating means and said relay coil upon being heated to a predetermined temperature by said heating means, means for adjusting said thermally responsive element to be operative at various temperatures to control said contact, a relay contact controlled by said relay coil, a socket receiving a plug to which an auxiliary circuit including an element to be periodically heated is connected, said socket being connected in series with said relay contact and adapted to be energized when said relay contact is closed, switching means associated with said socket, and a tell-tale light connected across said socket in series with said switching means, said socket and said switching means constructed and arranged to close the circuit through said tell-tale light in response to a plug insertion in said socket.

3. A device of the character described adapted to be connected to a source of current comprising a thermally responsive element, an electrical contact controlled by said element, electrical heating means connected in series with said contact and adapted to be energized to heat said element when said contact is closed, a relay coil connected in series with said contact and energized when said contact is closed, said thermally responsive element operating to open said contact and deenergize said heating means and said relay coil upon being heated to a predetermined temperature by said heating means, adjustable means for first closing said contact and then tensioning said element for adjusting the temperature at which said contact will be opened by said element, a relay contact controlled by said relay coil, a socket receiving a plug to which an auxiliary circuit including an element to be periodically heated is connected, said socket being connected in series with said relay contact and adapted to be energized when said relay contact is closed, switching means associated with said socket, and a tell-tale light connected across said socket in series with said switching means, said socket and said switching means constructed and arranged to close the circuit through said tell-tale light in response to a plug insertion in said socket.

SAMUEL FORBES.

REFERENCES CITED

The following references are of record in the file of this patent:

UNITED STATES PATENTS

| Number | Name | Date |
|---|---|---|
| 548,904 | Badt | Oct. 29, 1895 |
| 921,308 | Swan | May 11, 1909 |
| 1,680,809 | Shelton | Aug. 14, 1928 |
| 1,689,004 | Ackley | Oct. 23, 1928 |
| 1,781,244 | Oswald | Nov. 11, 1930 |
| 1,826,477 | Olpp | Oct. 6, 1931 |
| 1,900,831 | Marter | Mar. 7, 1933 |
| 2,044,147 | Bletz | June 16, 1936 |
| 2,064,389 | Smith | Dec. 15, 1936 |